United States Patent
Han

(10) Patent No.: US 10,292,520 B2
(45) Date of Patent: May 21, 2019

(54) JUICE EXTRACTOR AND FEEDING APPARATUS THEREOF

(71) Applicant: Weijie Han, Cixi (CN)

(72) Inventor: Weijie Han, Cixi (CN)

( * ) Notice: Subject to any disclaimer, the term of this patent is extended or adjusted under 35 U.S.C. 154(b) by 254 days.

(21) Appl. No.: 15/507,263

(22) PCT Filed: Sep. 3, 2014

(86) PCT No.: PCT/CN2014/085820
§ 371 (c)(1),
(2) Date: Feb. 28, 2017

(87) PCT Pub. No.: WO2016/029498
PCT Pub. Date: Mar. 3, 2016

(65) Prior Publication Data
US 2017/0280912 A1    Oct. 5, 2017

(30) Foreign Application Priority Data

Aug. 29, 2014    (CN) .................... 2014 2 0495952 U

(51) Int. Cl.
*A47J 19/02*    (2006.01)
*A47J 43/04*    (2006.01)
(Continued)

(52) U.S. Cl.
CPC ............. *A47J 19/02* (2013.01); *A47J 19/027* (2013.01); *A47J 43/07* (2013.01); *A47J 43/075* (2013.01); *A23N 1/02* (2013.01); *A47J 43/04* (2013.01)

(58) Field of Classification Search
CPC .......... A47J 19/027; A47J 43/04; A47J 42/56; A47J 43/075; A23N 1/02
(Continued)

(56) References Cited

U.S. PATENT DOCUMENTS

| 2,206,204 A | * | 7/1940 | Richli | ................... A47J 19/027 |
| | | | | 210/173 |
| 7,229,036 B2 | * | 6/2007 | Carnevale | ........... A47J 43/0772 |
| | | | | 241/101.3 |

(Continued)

*Primary Examiner* — Reginald Alexander
(74) *Attorney, Agent, or Firm* — Houtteman Law LLC

(57) ABSTRACT

A juice extractor and a feeding apparatus thereof are provided. The feeding apparatus includes a feed channel, a feed body connected to an upper port of the feed channel, and a cover plate assembly. The cover plate assembly includes a cover plate and an accommodating cavity with a large capacity. A shape of the cover plate matches an inner wall of the feed body and the cover plate is provided with a feed inlet, and the cover plate is rotatably provided on the inner wall of the feed body. The accommodating cavity with a large capacity is provided on a top surface of the cover plate, and has a sectional area greater than an area of the feed inlet, and is formed by an enclosure plate that surrounds the feed inlet. Upon inversion of the cover plate assembly, an opening of the accommodating cavity with a large capacity can be made to face the feed channel, and fruits and vegetables contained in the accommodating cavity with a large capacity are put in the feed channel. The feed inlet of the feed body is provided on the invertible cover plate assembly, so that not only diced fruits and vegetables are conveyed to the juice extractor, but also fruits and vegetables with large shapes fall into the feed channel by reverting the cover plate assembly without being diced. The juice extractor has a simple structure and can be conveniently used, so as to improve use safety.

16 Claims, 7 Drawing Sheets

(51) Int. Cl.
*A47J 43/07* (2006.01)
*A23N 1/02* (2006.01)

(58) Field of Classification Search
USPC .......... 99/510, 511, 512, 513; 241/37.5, 82, 241/285.1, 285.2, 285.3
See application file for complete search history.

(56) References Cited

U.S. PATENT DOCUMENTS

| | | | |
|---|---|---|---|
| 7,252,252 B2 * | 8/2007 | Mauch | A47J 43/0716 241/282.1 |
| 2006/0087916 A1 * | 4/2006 | Yang | A47J 19/027 366/314 |
| 2008/0111011 A1 * | 5/2008 | Wang | A47J 43/0788 241/37.5 |
| 2008/0156913 A1 * | 7/2008 | Orent | A47J 43/046 241/37.5 |
| 2014/0196614 A1 * | 7/2014 | Kim | A47J 19/025 99/513 |

* cited by examiner

JUICE EXTRACTOR AND FEEDING APPARATUS THEREOF

TECHNICAL FIELD

This invention relates to a juice extractor, and specifically relates to a juice extractor and a feeding apparatus thereof.

BACKGROUND ART

Currently, household juice extractors in the market are mainly divided into high speed centrifugal juice extractors and low speed raw juice extractors. According to national safety standards, a feed inlet of a conventional high speed centrifugal juice extractor needs to be higher than a cutter by at least 100 mm, and there are also corresponding requirements for sectional sizes: an average of a maximum sectional size and a minimum sectional size cannot exceed 65.5 mm, and the maximum sectional size cannot exceed 76 mm; however, a feed inlet of a low speed raw juice extractor needs to be higher than a feed screw by at least 100 mm, and a maximum sectional size should not exceed 45 mm, and a pusher placed in the feed inlet further needs to be provided.

Based on the above, currently, neither the conventional high speed centrifugal juice extractor nor the low speed raw juice can directly juice fruits and vegetables with a diameter greater than 75 mm. However, diameters of a lots of fruits, for example, apples, oranges, and pairs in daily life exceed 75 mm, and people make juice by using a juice extractor only after dicing such fruits into dices that meet a requirement, which is time consuming and energy consuming, and brings much inconvenience to people. Therefore, current juice extractors have the problem that they cannot directly juice fruits and vegetables with large shapes.

CONTENT OF INVENTION

The technical problem to be solved by this invention is the problem that current juice extractors cannot juice fruits and vegetables with large shapes.

To solve the foregoing technical problem, a technical solution used by this invention is to provide a feeding apparatus of a juice extractor. The feeding apparatus of a juice extractor includes a feed channel and a feed body connected to an upper port of the feed channel, and further includes a cover plate assembly, where the cover plate assembly includes:

a cover plate, a shape of which matches an inner wall of the feed body and which is provided with a feed inlet, where the cover plate is rotatably provided on the inner wall of the feed body; and an accommodating cavity with a large capacity, which is provided on a top surface of the cover plate, where a sectional area of the accommodating cavity with a large capacity is greater than an area of the feed inlet, and is formed by an enclosure plate that surrounds the feed inlet;

upon inversion of the cover plate assembly, an opening of the accommodating cavity with a large capacity can be made to face the feed channel downwards from facing upwards, and fruits and vegetables contained in the accommodating cavity with a large capacity are put in the feed channel.

In the foregoing feeding apparatus of a juice extractor, a collar is fixed to an upper edge of the feed body;

a fixing seat with a rotation shaft is provided on either side of the cover plate assembly, and the fixing seat is rotatably provided on the collar;

a lock piece is provided on a top surface of the collar; by means of up-to-down movement of the lock piece, the lock piece is engaged or is disengaged with the fixing seat, so that the cover plate assembly is in rotatable state or locked state.

In the foregoing feeding apparatus of a juice extractor, a lug that extends downwards is separately provided on either of opposite two sides of the collar;

a semicircular opening in communication with a top surface of the feed body is separately provided on either of two opposite side walls of the feed body; a U-shaped ear plate matching the lug is provided on an outer side of the semicircular opening, and the lug is placed and fixed in the U-shaped ear plate.

In the foregoing feeding apparatus of a juice extractor, the lock piece includes:

a press portion, which is flat-shaped;

a clamping plate, provided on one side of a bottom surface of the press portion, where a lower edge of the clamping pate matches the fixing seat;

an elastic limiting plate, provided on the other side of the bottom surface of the press portion; two limiting grooves arranged from up to down are provided on the elastic limiting plate; an insertion hole that matches the clamping plate and the elastic limiting plate are provided on the top surface of the collar; a blocking raised block that matches the limiting grooves is provided on an inner wall of the insertion hole; the clamping plate and the elastic limiting plate are inserted in the insertion hole; by means of up-to-down movement of the lock piece, the blocking raised block is snapped in one of the limiting grooves, and at the same time, the clamping plate is engaged or is disengaged with the fixing seat, so that the cover plate assembly is in rotatable state or locked state.

In the foregoing feeding apparatus of a juice extractor, a pin shaft is separately fixed on either of two side walls of the cover plate; the pin shaft extends into the fixing seat and is engaged and fixed; a rotation shaft is provided on an outer side surface of the fixing seat; a rotation seat is fixedly provided in the lug; and the rotation shaft is rotatably provided in the rotation seat.

In the foregoing feeding apparatus of a juice extractor, a U-shaped opening is separately provided on either of opposite two side walls of the enclosure plate.

In the foregoing feeding apparatus of a juice extractor, an accommodating cavity with a large capacity is also provided on a bottom surface of the cover plate.

In the foregoing feeding apparatus of a juice extractor, an upper edge of the feed body is lower than an upper edge of the enclosure plate.

This invention further provides a juice extractor, including the juice extractor host, and the feeding apparatus, which has the foregoing structure, of a juice extractor, where the feeding apparatus of the juice extractor is provided on the juice extractor host.

According to this invention, a feed inlet of the feed body is provided on the invertible cover plate assembly, which has a feed inlet and an accommodating cavity with a large capacity that is formed by an enclosure plate, so that fruits and vegetables with small shapes can directly fall into the feed body via the feed inlet, and large fruits and vegetables that cannot pass through the feed inlet, for example, apples and pears, can be placed in the accommodating cavity with a large capacity, and can be made to fall into the feed body upon inversion of the cover plate assembly without being diced, which saves time and energy, and the accommodating cavity with a large capacity can prevent children from putting hands into the feed body or inside of the feed channel. Therefore, the feeding apparatus not only can be conveniently used and has a simple structure, but also improves use safety.

DETAILED DESCRIPTION OF THE INVENTION

A technical solution used in this invention provides a juice extractor and a feeding apparatus thereof. By using the feeding apparatus, not only diced fruits and vegetables can be conveyed to the juice extractor, but also large fruits, for example, apples and pears, can be conveyed to the juice extractor without being diced. The feeding apparatus has a simple structure, can be conveniently used, and improves use safety. This invention is described in detail below with reference to specific embodiments and the accompanying drawings of the specification.

Figure 1:
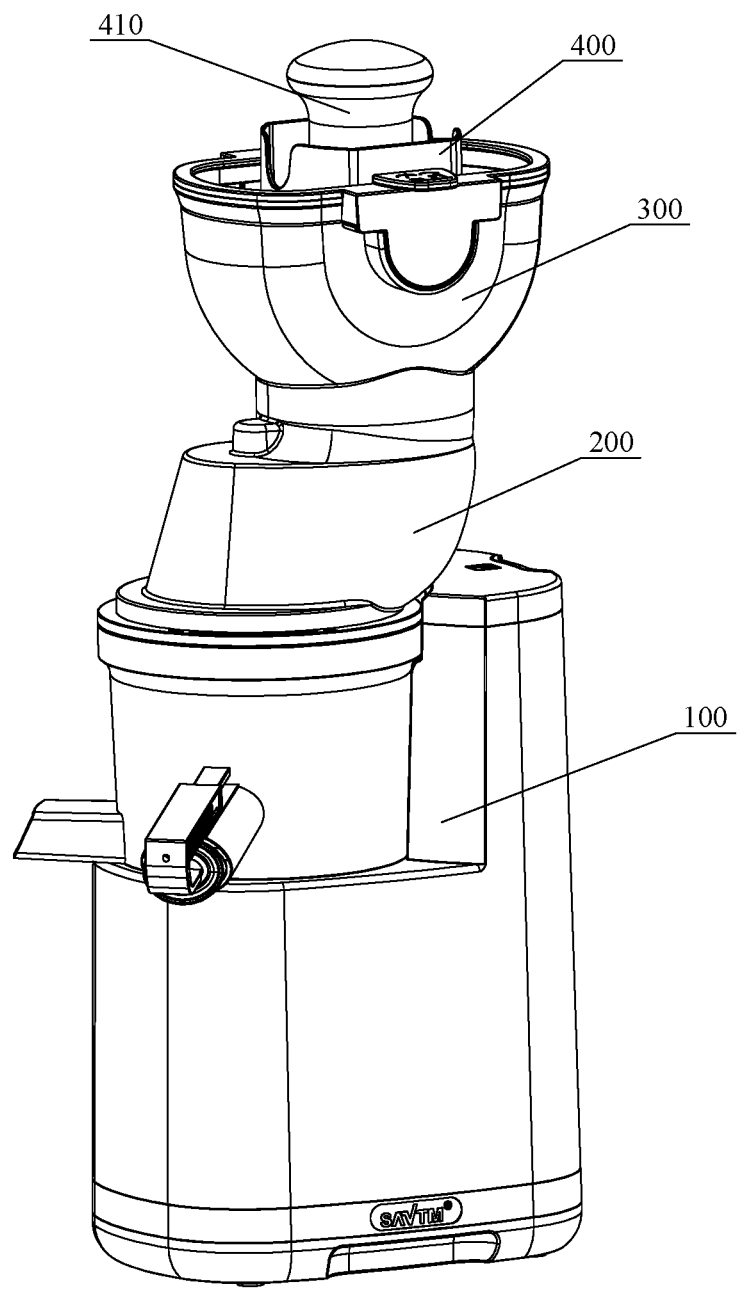
FIG. 1 is a schematic structural diagram of a juice extractor in this invention.
Figure 3:
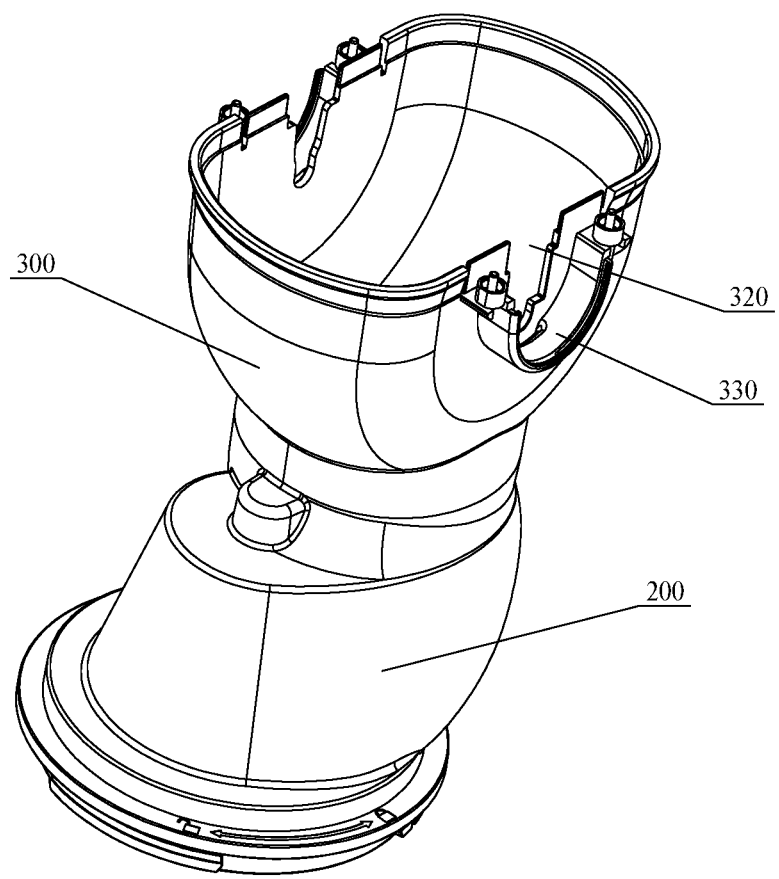
FIG. 3 is an schematic exploded view of a cover plate and a collar in this invention.
Figure 5:
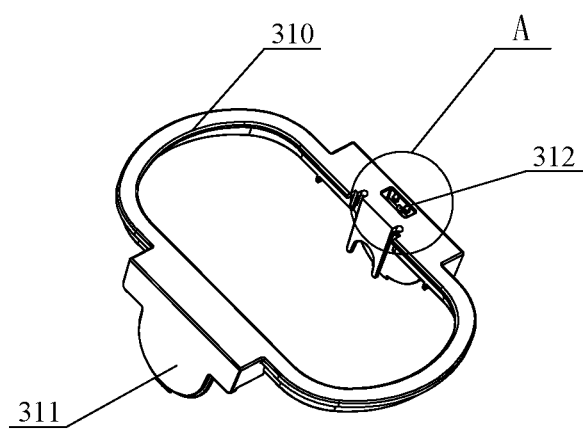
FIG. 5 is a schematic structural diagram of a collar in this invention.

As shown in FIG. 1, a juice extractor of this invention includes a juice extractor host 100 and a feeding apparatus; the juice extractor host 100 includes a base in which a motor is built and a juice extraction component provided on the base; the juice extraction component matches the motor; the feeding apparatus is formed by a feed channel 200, a feed body 300, and a cover plate assembly 400; a lower part of the feed body 300 is connected to an upper port of the feed channel 200, and they are integrally formed; the feed channel 200 is engaged and fixed on the juice extraction component by rotating to a suitable location; a shape of the cover plate assembly 400 matches a shape of an upper inner wall of the feed body 300 and closes an upper port of the feed body 300; the cover plate assembly 400 is rotatably provided on the inner wall of the feed body 300;

as shown in FIG. 3 and FIG. 5, a collar 310 is fixed to an upper edge of the feed body 300; a lug 311 that extends downwards is separately provided on either of opposite two side surfaces of the collar 310; a semicircular opening 320 in communication with a top surface of the feed body is separately provided on either of two opposite side walls of the feed body 300; a U-shaped ear plate 330 is provided on an outer side of the semicircular opening 320, and the lug 311 is placed in the U-shaped ear plate 330 and is screwed and fixed to the U-shaped ear plate 330.

Figure 4:
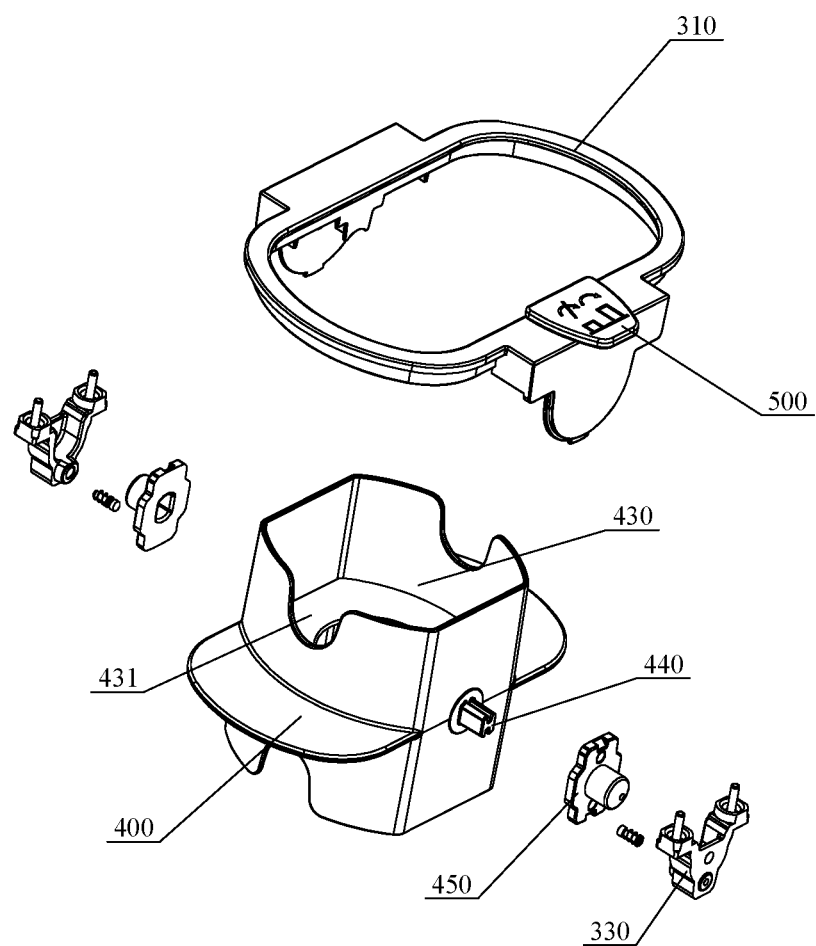
FIG. 4 is a schematic structural diagram of a feed channel and a feed body in this invention.

With reference to FIG. 4 and FIG. 5, an insertion hole is provided on a top surface of one of the lugs 311 of the collar 310; a lock piece 500 is inserted in the insertion hole; by means of up-to-down movement of the lock piece 500, the cover plate assembly 400 can be controlled to be in rotatable state or locked state.

Figure 6:
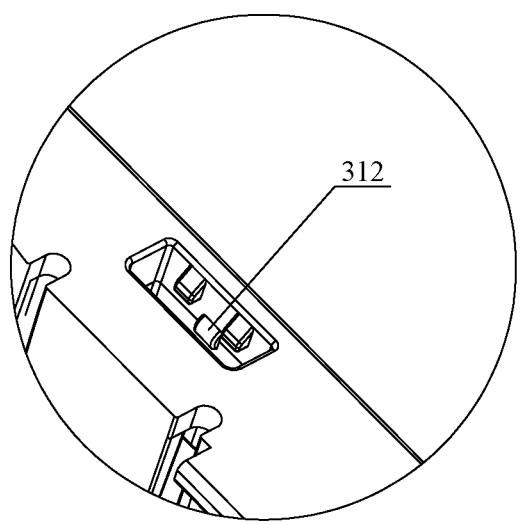
FIG. 6 is an enlarged view of Part A in FIG. 5.

A structure of the lock piece 500 is shown in FIG. 6. A flat-shaped press portion 510 is provided on an upper end of the lock piece 500; a clamping plate 520 that protrudes downwards and an elastic limiting board 530 are separately provided on a bottom surface of the press portion 510; the clamping plate 520 and the elastic limiting board 530 are parallel to each other and are located on opposite two sides; a shape of a lower edge of the clamping plate 520 matches a shape of an upper edge of a fixing seat 450; multiple limiting grooves 531 are provided on the elastic limiting board 530; a blocking raised block 312 that matches the limiting grooves 531 is provided on an inner wall of the insertion hole.

A quantity of the limiting grooves 531 in this invention is two, and the two limiting grooves 531 are arranged from up to down; by means of a match between the two limiting grooves 531 that are arranged from up to down and the blocking raised block 312, the cover plate assembly 400 can be controlled to rotate or not rotate in the feed body 300; for example, if the lock piece 500 is pressed downwards to be completely pressed into the collar 310, then the limiting grooves 531 located above are engaged with the blocking raised block 312, and the clamping plate 520 is completely engaged with the upper edge of the fixing seat 450, and the cover plate assembly 400 cannot rotate in the feed body 300 and is locked; if the lock piece 500 is pulled out upwards to make the limiting grooves 531 located below engaged with the blocking raised block 312, then the clamping plate 520 is disengaged with the fixing seat 450, and the cover plate assembly 400 can freely rotate in the feed body 300.

Figure 2:
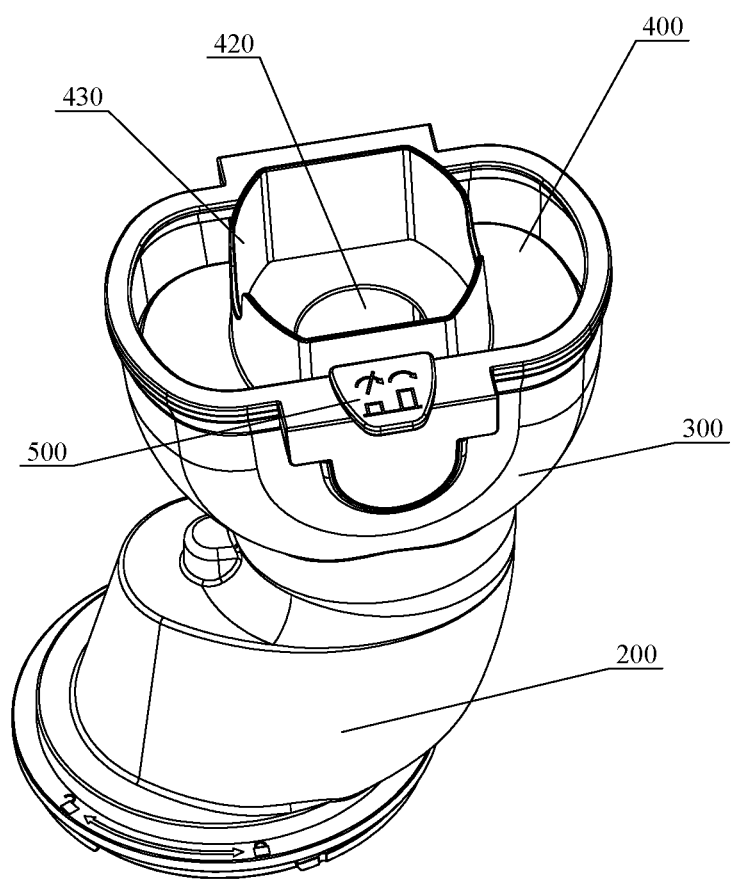
FIG. 2 is a schematic structural diagram of a feeding apparatus, from which a material push rod is removed, in this invention.

With reference to FIG. 1, FIG. 2, and FIG. 4, the cover plate assembly 400 includes a cover plate and an accommodating cavity with a large capacity 430 formed by an enclosure plate; a feed inlet 420 is provided in the middle of the cover plate; the feed inlet 420 may not be provided in the center of the cover plate; the feed inlet 420 is a circular through hole, and has a diameter of about 40 mm. The enclosure plate is symmetrically provided around the feed inlet 420 on a top surface and a bottom surface of the cover plate, and may also be provided on the top surface of the cover plate; however, the top surface and the bottom surface of the cover plate are both provided with the accommodating cavity with a large capacity 430, and the cover plate can be continued to be used after one rotation without returning to original state, so as to improve use efficiency.

The enclosure plate is in a shape of a smooth quadrangle, and has a height of about 60 mm; fruits and vegetables with large shapes (a maximum diameter is greater than that of the feed inlet) can be placed in the enclosure plate; a U-shaped opening 431 is separately provided on either of two opposite side plates of the enclosure plate for a user to pick and place large fruits. The enclosure plate can prevent children from putting hands inside the feed body or the feed channel, so as to ensure operation safety of the juice extractor. A material push rod 410 is inserted in the feed inlet 420. The material push rod 410 not only can push fruits and vegetables to be conveyed downwards, but also has a function of closing the feed inlet 420, so as to ensure sanitation and hygiene of the environment in the juice extractor.

Figure 7:
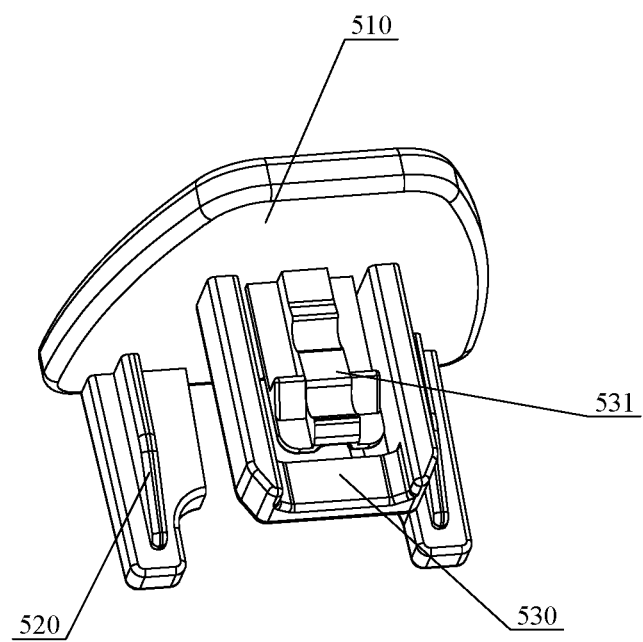
FIG. 7 is a schematic structural diagram of a lock piece in this invention.
Figure 8:
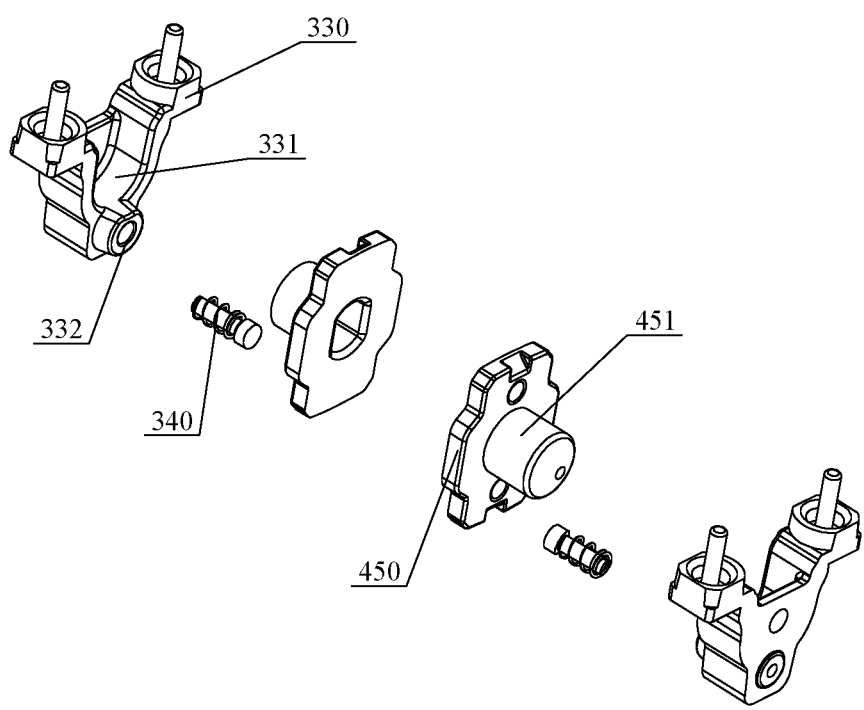
FIG. 8 is a schematic exploded view of a fixing seat and a rotation seat of this invention.

As shown in FIG. 7 and FIG. 4, a pin shaft 440 is provided on either end of the cover plate assembly 400; the fixing seat 450 is fixedly provided on the pin shaft 440; the pin shaft 440 extends into the fixing seat 450 and is engaged and fixed with the fixing seat 450; a rotation shaft 451 is provided on an outer side surface of the fixing seat 450. Two small pits that are longitudinally symmetrical are further provided on the outer side surface of the fixing seat 450 to match a lock pin on a rotation seat 330 to perform a positioning function.

The rotation seat 330 is provided in a cavity enclosed by the lug 311 and the ear plate 311; upper two sides of the rotation seat are screwed in the lug 311 of the collar 310, and a lower part of the rotation seat is provided with a support portion 331 and a support hole 332 that match the rotation shaft 451 and a strut 452; the support hole 332 is provided with a round head lock pin 340 with a spring; a round head portion of the round head lock pin 340 extends out of the support hole 332 to abut against the outer side surface of the fixing seat 450. The rotation shaft 451 rotatably matches the rotation seat 330, so that the cover plate assembly 400 can rotate around the rotation seat 330. When the cover plate is at an initial horizontal location or a horizontal location after 180-degree inversion, the round head lock pin 340 abuts in a corresponding pit on the fixing seat 450, so that the cover plate assembly is accurately positioned.

The following is a specific use method of this invention:

(1) fruits and vegetables that are diced or have small diameters are directly put via the feed inlet 420 in the center of the cover plate into the juice extractor host 100 via the feed body 300 and the feed channel 200; a motor is started to perform juice extraction; and (2) fruits and vegetables with large diameters are first put into the accommodating cavity with a large capacity 430; then the lock piece 500 is pulled out upwards; the enclosure plate is toggled to rotate for 180 degrees, so that an opening of the accommodating cavity with a large capacity 430 faces the feed channel 200, and the fruits and vegetables contained in the accommodating cavity with a large capacity 430 are put into the feed channel 200; then the fruits and vegetables with large shapes enter the juice extractor host 100 via the feed body 300 and the feed channel 200; the lock piece 500 is pressed to lock the cover plate assembly 400, so that the cover plate assembly 400 cannot rotate, and the motor is started to perform juice extraction. Based on the above, by means of this invention, not only diced fruits and vegetables can be conveyed to the juice extractor, but also large fruits, for example, apples and pears, can be conveyed to the juice extractor, so as to solve the problem that fruits and vegetables with large shapes have difficulty in entering the juice extractor. The fruits and vegetables with large shapes do not need to be diced, so that time and energy of people are greatly saved. In addition, the cover plate can be fixed, by means of the lock piece, to be used as a common juice extractor. The feeding apparatus not only has a simple structure, can be conveniently used, but also has high safety and strong practicability.

This invention is not limited to the foregoing optimal implementation manner; any person should know structural changes made in light of the teaching of this invention; any technical solution the same as or similar to that of this invention shall fall into the protection scope of this invention.

The invention claimed is:

1. A feeding apparatus of a juice extractor, comprising a feed channel and a feed body connected to an upper port of the feed channel, characterized by further comprising a cover plate assembly, wherein the cover plate assembly comprises:

a cover plate, a shape of which matches an inner wall of the feed body and which is provided with a feed inlet, wherein the cover plate is rotatably provided on the inner wall of the feed body; and an accommodating cavity with a large capacity, which is provided on a top surface of the cover plate, wherein a sectional area of the accommodating cavity with a large capacity is greater than an area of the feed inlet, and is formed by an enclosure plate that surrounds the feed inlet;

upon inversion of the cover plate assembly, an opening of the accommodating cavity with a large capacity can be made to face the feed channel downwards from facing upwards, and fruits and vegetables contained in the accommodating cavity with a large capacity are put in the feed channel.

2. The feeding apparatus of a juice extractor according to claim 1, characterized in that:

a collar is fixed to an upper edge of the feed body;

a fixing seat with a rotation shaft is provided on either side of the cover plate assembly, and the fixing seat is rotatably provided on the collar;

a lock piece is provided on a top surface of the collar; by means of up-to-down movement of the lock piece, the lock piece is engaged or is disengaged with the fixing seat, so that the cover plate assembly is in rotatable state or locked state.

3. The feeding apparatus of a juice extractor according to claim 2, characterized in that:

a lug that extends downwards is separately provided on either of opposite two sides of the collar;

a semicircular opening in communication with a top surface of the feed body is separately provided on either of two opposite side walls of the feed body; a U-shaped ear plate matching the lug is provided on an outer side of the semicircular opening, and the lug is placed and fixed in the U-shaped ear plate.

4. The feeding apparatus of a juice extractor according to claim 2, characterized in that, the lock piece comprises:

a press portion, which is flat-shaped;

a clamping plate, provided on one side of a bottom surface of the press portion, wherein a lower edge of the clamping pate matches the fixing seat; and an elastic limiting plate, provided on the other side of the bottom surface of the press portion; two limiting grooves arranged from up to down are provided on the elastic limiting plate; an insertion hole that matches the clamping plate and the elastic limiting plate are provided on the top surface of the collar; a blocking raised block that matches the limiting grooves is provided on an inner wall of the insertion hole; the clamping plate and the elastic limiting plate are inserted in the insertion hole; by means of up-to-down movement of the lock piece, the blocking raised block is snapped in one of the limiting grooves, and at the same time, the clamping plate is engaged or is disengaged with the fixing seat, so that the cover plate assembly is in rotatable state or locked state.

5. The feeding apparatus of a juice extractor according to claim 2, characterized in that, a pin shaft is separately fixed on either of two side walls of the cover plate; the pin shaft extends into the fixing seat and is engaged and fixed; a rotation shaft is provided on an outer side surface of the fixing seat; a rotation seat is fixedly provided in the lug; and the rotation shaft is rotatably provided in the rotation seat.

6. The feeding apparatus of a juice extractor according to claim 1, characterized in that, a U-shaped opening is separately provided on either of opposite two side walls of the enclosure plate.

7. The feeding apparatus of a juice extractor according to claim 1, characterized in that, an accommodating cavity with a large capacity is also provided on a bottom surface of the cover plate.

8. The feeding apparatus of a juice extractor according to claim 1, characterized in that, an upper edge of the feed body is lower than an upper edge of the enclosure plate.

9. A juice extractor, comprising a juice extractor host, characterized by further comprising the feeding apparatus of a juice extractor according to claim 1, wherein the feeding apparatus of the juice extractor is provided on the juice extractor host.

10. A juice extractor, comprising a juice extractor host, characterized by further comprising the feeding apparatus of a juice extractor according to claim 2, wherein the feeding apparatus of the juice extractor is provided on the juice extractor host.

11. A juice extractor, comprising a juice extractor host, characterized by further comprising the feeding apparatus of a juice extractor according to claim 3, wherein the feeding apparatus of the juice extractor is provided on the juice extractor host.

12. A juice extractor, comprising a juice extractor host, characterized by further comprising the feeding apparatus of a juice extractor according to claim 4, wherein the feeding apparatus of the juice extractor is provided on the juice extractor host.

13. A juice extractor, comprising a juice extractor host, characterized by further comprising the feeding apparatus of a juice extractor according to claim 5, wherein the feeding apparatus of the juice extractor is provided on the juice extractor host.

14. A juice extractor, comprising a juice extractor host, characterized by further comprising the feeding apparatus of a juice extractor according to claim 6, wherein the feeding apparatus of the juice extractor is provided on the juice extractor host.

15. A juice extractor, comprising a juice extractor host, characterized by further comprising the feeding apparatus of a juice extractor according to claim 7, wherein the feeding apparatus of the juice extractor is provided on the juice extractor host.

16. A juice extractor, comprising a juice extractor host, characterized by further comprising the feeding apparatus of a juice extractor according to claim 8, wherein the feeding apparatus of the juice extractor is provided on the juice extractor host.

* * * * *